United States Patent [19]
Shu et al.

[11] Patent Number: 5,435,389
[45] Date of Patent: * Jul. 25, 1995

[54] SAND CONTROL AGENT AND PROCESS

[75] Inventors: Paul Shu, Cranbury, N.J.; Lloyd G. Jones, Dallas, Tex.; E. Thomas Strom, Dallas, Tex.; Charles S. Yeh, Plano, Tex.

[73] Assignee: Mobil Oil Corporation, Fairfax, Va.

[*] Notice: The portion of the term of this patent subsequent to May 18, 2010 has been disclaimed.

[21] Appl. No.: 63,201

[22] Filed: May 18, 1993

Related U.S. Application Data

[62] Division of Ser. No. 810,648, Dec. 19, 1991, Pat. No. 5,211,235.

[51] Int. Cl.⁶ .................... E21B 33/138; E21B 43/22
[52] U.S. Cl. .................... 166/276; 166/293; 166/300
[58] Field of Search ............... 166/270, 276, 292, 293, 166/295, 300

[56] References Cited

U.S. PATENT DOCUMENTS

| | | | |
|---|---|---|---|
| 3,012,405 | 12/1961 | Caron | 166/293 |
| 3,097,694 | 7/1963 | Kerver | 166/276 |
| 3,434,540 | 3/1969 | Stein | 166/250 |
| 3,437,143 | 4/1969 | Cook | 166/285 |
| 3,708,013 | 1/1973 | Dismukes | 166/276 |
| 3,756,318 | 9/1973 | Stein et al. | 166/278 |
| 3,918,521 | 11/1975 | Snavely, Jr. et al. | 166/272 |
| 3,983,941 | 10/1976 | Fitch | 166/276 |
| 4,232,740 | 11/1980 | Park | 166/276 |
| 4,381,665 | 5/1983 | Levine et al. | 73/73 |
| 4,433,729 | 2/1984 | Sydansk | 166/292 X |
| 4,440,227 | 4/1984 | Holmes | 166/261 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,549,608 | 10/1985 | Stowe et al. | 166/280 |
| 4,669,542 | 6/1987 | Venkatsan | 166/258 |
| 4,785,883 | 11/1988 | Hoskin et al. | 166/270 |
| 4,945,991 | 8/1990 | Jones | 166/278 |
| 5,211,235 | 5/1993 | Shu et al. | 166/276 X |

*Primary Examiner*—George A. Suchfield
*Attorney, Agent, or Firm*—Alexander J. McKillop; Malcolm D. Keen; Charles A. Malone

[57] ABSTRACT

A cement for forming a gravel pack in a washed-out interval is provided where a borehole penetrates an unconsolidated or loosely consolidated oil or gas reservoir which is likely to introduce substantial amounts of sand into the borehole. After perforating the borehole's casing at a washed-out interval of the formation, sand is introduced into the interval. Afterwards, an aqueous silicate solution is injected into said interval. Next, a spacer volume of a water-immiscible hydrocarbonaceous liquid is introduced into the interval. Thereafter, a water-miscible organic solvent containing an alkylpolysilicate is injected into the interval. A permeability retaining silica cement is formed in the interval thereby making a gravel pack. Injection of the aqueous silicate and organic solvent containing an alkylpolysilicate is continued until the interval has been consolidated by the silica cement to an extent sufficient to exclude sand and formation fines.

11 Claims, 1 Drawing Sheet

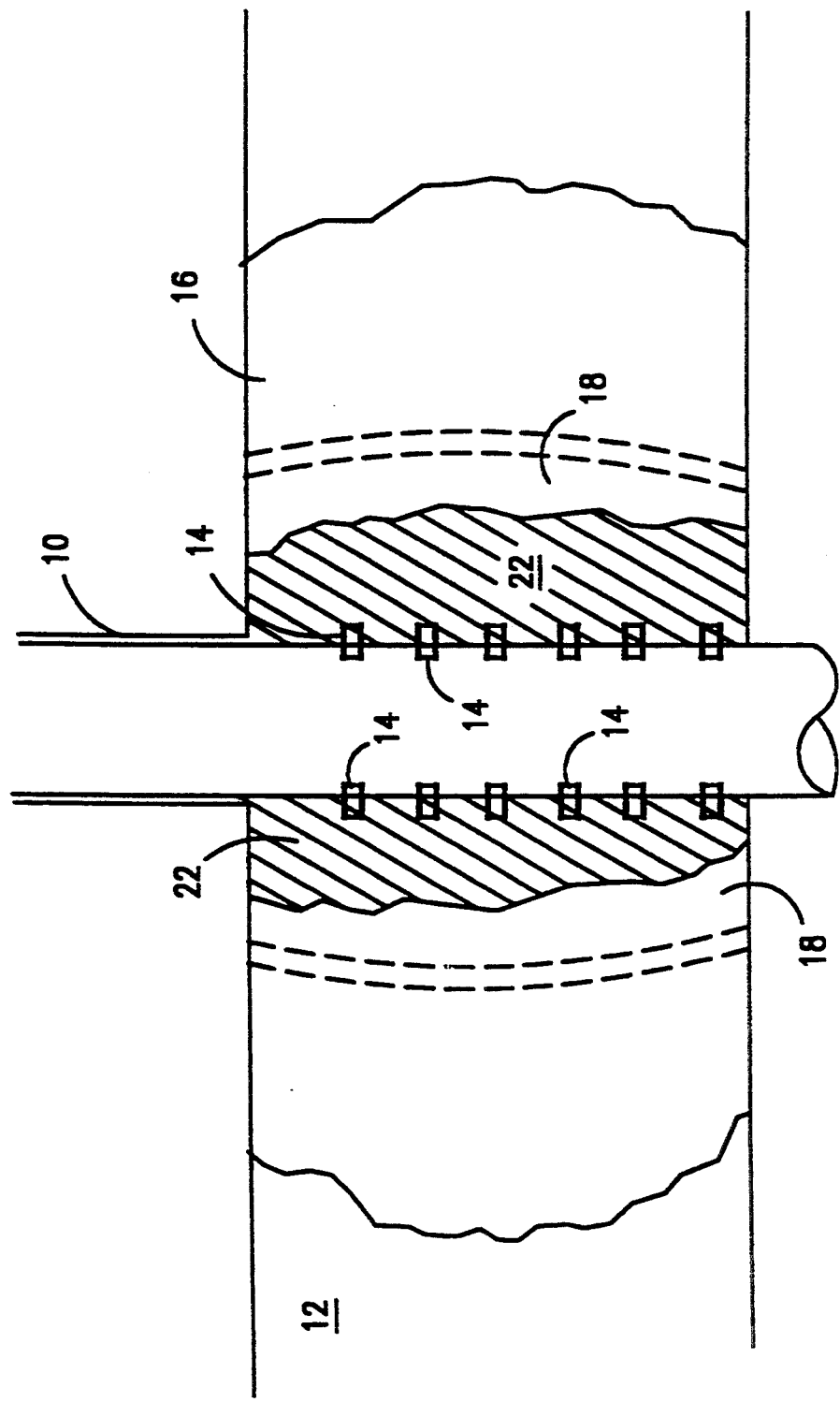

SAND CONTROL AGENT AND PROCESS

This is a division of application Ser. No. 07/810,648, filed on Dec. 19, 1991, now U.S. Pat. No. 5,211,235.

FIELD OF THE INVENTION

This invention relates to a method for gravel packing formations using a silica cement in combination with a gravel pack operation to minimize formation damage and prevent fines migration.

BACKGROUND OF THE INVENTION

Sand consolidation and gravel packing are two near wellbore techniques widely used for controlling the production of sand from producing wells such as oil wells, gas wells and similar boreholes. In many instances, highly porous and fragmentable sand formations surround a wellbore. Under production conditions, sand is often displaced from its aggregated structure and carried along by the fluid flood operations to a producing well. If sand flow is allowed to proceed unchecked, the producing wellbore soon becomes full of sand, thereby clogging the wellbore and impeding oil production. Furthermore, sand arriving at the surface site of the well erodes the production hardware.

As more and more sand is displaced from its original formation, a region of wash-out cavities surrounding the wellbore region results. As the wash-out zones become more extensive, the integrity of the wellbore is threatened and a danger of the wellbore collapsing exists.

It has therefore been the subject of extensive and intense research by the petroleum industry to develop techniques to minimize or obviate displacement of sand particles into producing well areas and prevent the formation of wash-out cavities surrounding the wellbore. One such general approach suggested by the art is to consolidate the coarse sand structures prior to fluid production. Sand consolidation techniques are aimed at cementing loose sand structures adjacent a wellbore. Such consolidation is effective to prevent breakdown of sand formation and subsequent clogging of producing wells.

In many loosely consolidated or unconsolidated formations, it is not economically or practically feasible to consider sand consolidation techniques. Also, there are many instances where substantial wash-out cavities are either initially present naturally near the wellbore or washed-out cavities form around the wellbore after prolonged use despite previous attempts at sand consolidation.

For these conditions, gravel packing techniques are often used to prevent formation sand production or further erosion and to reestablish the integrity of the wellbore periphery. Gravel packing is the primary sand control technique involving the introduction of a fluid suspension of exogenous particulate matter downhole to fill the wash-out cavities or to "squeeze" a pack into the formation in the vicinity of the well. The term gravel is somewhat loosely applied in the art to encompass hard, rigid particulate matter ranging in size from a coarse sand to pebble size material.

Once the placement of sand and gravel has been accomplished, a slotted liner or "screen" placed as part of the production string helps hold the loose filling material and retards upstream sand flow through the filler material during production conditions.

Gravel packing can be accomplished by several accepted methods. One method is to place a gravel pack in the well adjacent the entire portion of the formation exposed to the well to form a gravel filter. In a cased perforated well, the gravel may be placed inside the casing adjacent the perforations to form an inside-the-casing gravel pack or may be placed outside the casing and adjacent the formation or may be placed both inside and outside the casing. Various such conventional gravel packing techniques are described in U.S. Pat. Nos. 3,434,540; 3,708,013; 3,756,318; and 3,983,941. These patents are incorporated by reference herein. Such conventional gravel packing techniques have generally been successful in controlling the flow of sand from the formation into the well. Sometimes, however, the gravel pack is unable to preclude fines migration which necessitates costly workovers to be initiated.

Therefore, what is needed is a method to prevent fines migration through a gravel pack so as to prevent costly workovers.

SUMMARY OF THE INVENTION

This invention is directed to a method for controlling sand production in an unconsolidated or loosely consolidated oil or hydrocarbonaceous fluid containing formation or reservoir which is penetrated by at least one wellbore. A gravel packing operation is conducted so as to prevent caving of a washed-out area around said wellbore. Once the gravel packing sand has been placed into the caved out area adjacent the wellbore in the formation, a silica cement is formed in-situ so as to reduce the permeability of the gravel pack sand as little as possible while consolidating said pack and area substantially near the wellbore.

In the practice of this invention, an aqueous organoammonium silicate, alkali metal or ammonium silicate solution is injected into an interval of the formation containing the gravel pack sand. The aqueous silicate solution enters the interval through perforations made in a cased well penetrating the formation. By use of a mechanical packer, penetration of the fluid into the interval can be controlled. As the aqueous silicate enters the interval, it saturates said interval.

Thereafter, a spacer volume of a water-immiscible hydrocarbonaceous liquid is directed into the interval. Hydrocarbonaceous liquids for use herein comprise paraffinic and aromatic liquids. Paraffinic liquids are preferred. Preferred paraffinic liquids are selected from a member of the group consisting of mineral oils, naphthas, $C_5$–$C_{40}$ alkanes and mixtures thereof.

After a desired spacer volume of hydrocarbonaceous liquid has been placed into the interval requiring sand consolidation, a water-miscible organic solvent containing an alkylpolysilicate is next injected into the interval. Upon coming into contact with the organoammonium silicate, alkali metal or ammonium silicate solution which remains on the sand grains and between the sand grain contact points, alkylpolysilicate reacts with the organoammonium silicate, alkali metal or ammonium silicate to form silica cement in the interval being treated. The silica cement which is formed is stable at pH's of 7 or less and temperatures in excess of about 1,000° C. (1,832° F.). These steps can be repeated until the fines migration is controlled. Thereafter, production is commenced and substantially fines free hydrocarbonaceous fluids are produce to the surface.

Once the treated interval has been consolidated to a desired strength, an enhanced oil recovery method can be used to produce hydrocarbonaceous fluids to the surface. EOR methods which can be utilized include water-flooding, steam-flooding, carbon dioxide stimulation, or fire-flooding. By controlling the concentration and rate of injection of the aqueous organoammonium silicate, alkali metal or ammonium silicate and the organic solvent containing the alkylpolysilicate which are injected into the interval being treated, the consolidation strength, permeability, and porosity of the gravel pack and formation can be tailored as desired.

It is therefore an object of this invention to provide for an in-situ silica cement composition so as to exclude fines and sand from produced hydrocarbonaceous fluids which composition is more natural to a formation's environment.

It is another object of this invention to provide for a composition which will ensure an even flow front, a homogeneous consolidation and uniform porosity so as to substantially exclude the entry of formation fines and sand into a wellbore from an interval treated with said composition.

It is yet another object of this invention to consolidate an unconsolidated or loosely consolidated interval in a formation containing gravel pack sand so as to exclude formation fines or sand.

It is a still yet further object of this invention to provide for a method to obtain a desired permeability within an interval of a formation containing gravel pack sand which can be reversed by treating the interval with a strong acid.

It is an even still yet further object of this invention to provide for a formation consolidation and porosity reduction agent which is resistant to water, high temperatures and high pH's so that the formed gravel pack can be used with enhanced oil recovery (EOR) operations.

It is yet an even still further object of this invention to provide for a consolidation and permeability reducing composition lacking a particulate matter therein so as to allow penetration of the composition into an area requiring consolidation, flow alteration, or pore size reduction.

It is a still even yet further object of this invention to provide for a simple consolidation composition and method which can tolerate water, residual oil and fines.

BRIEF DESCRIPTION OF THE DRAWING

The drawing is a schematic representation showing how the composition is injected into the formation so as to consolidate sand grains while maintaining the porosity of the formation.

DESCRIPTION OF THE PREFERRED EMBODIMENT

In the practice of this invention, sand preferably gravel packing sand, is directed into a washed out area adjacent to a wellbore that penetrates a hydrocarbonaceous fluid producing zone. The washed out area extends circumferentially from the wellbore into the formation which causes an increased possibility that the wellbore will collapse. Gravel is placed into the washed out area by directing sand through perforations in a casing until the washed out area is filled with the sand. A method which can be used for gravel packing a well is discussed in U.S. Pat. No. 4,945,991 which issued to Jones on Aug. 7, 1990. This patent is hereby incorporated by reference herein.

After the washed area has been packed by sand, sand is consolidated by forming a silica cement in-situ while a desired permeability is retained in the sand within the consolidated washed out area. A silica cement is formed and binds sand within the washed out area which is sufficient to preclude formation fines or sand from being produced to the surface along with hydrocarbonaceous fluids. As is known by those skilled in the art, core samples taken from the formation containing the washed out area can be used to determine the extent to which the agent must be applied.

In the practice of this invention, as shown in the drawing, an aqueous organoammonium silicate, alkali metal or ammonium silicate slug is injected into well 10 where it enters formation 12 via perforations 14. A method for perforating a wellbore is disclosed in U.S. Pat. No. 3,437,143 which issued to Cook on Apr. 8, 1969. This patent is hereby incorporated by reference herein. As the aqueous slug containing the organoammonium silicate, alkali metal or ammonium silicate proceeds through formation 12, it fills the pores in the formation.

Also, as the aqueous organoammonium silicate, alkali metal or ammonium silicate solution proceeds through zone 12, it deposits a film of said aqueous silicate on sand grains therein. This aqueous silicate also fills intersitial spaces between the sand grains. A spacer volume of a water-immiscible hydrocarbonaceous liquid 16 is directed through zone 12 so as to remove excess aqueous silicate from the intersitial spaces while leaving sufficient aqueous silicate adhering filmwise to the sand grains. The hydrocarbonaceous liquid comprises paraffinic and aromatic hydrocarbons.

This spacer volume of water-immiscible hydrocarbonaceous liquid 16 is selected from a member of the group consisting of mineral oils, naphthas, $C_5$–$C_{40}$ alkanes and mixtures thereof. Hydrocarbonaceous liquid used as a spacer volume can be of an industrial grade. A spacer volume of hydrocarbonaceous liquid is used to remove excess aqueous silicate from between the sand grains while allowing a thin silicate film to remain on the surface to obtain a cementing reaction with a subsequently injected water-miscible organic solvent containing an alkylpolysilicate.

Afterwards, a water-miscible organic solvent containing an alkylpolysilicate soluble therein is injected into formation 12 where it forms in-situ a permeability retentive silica cement which is stable to temperatures up to and in excess of about 1,000° C. (1,832° F.). Once the silica cement has hardened and formation 12 has been consolidated to the extent desired, by repeated applications if necessary, an EOR operation is initiated in formation 12.

The cementing reaction which takes place binds sand grains in the formation thereby forming a consolidated porous zone 22. Although the sand grains are consolidated, a cement is formed which results in a substantially high retention of the formation's permeability.

In order to increase the cement's consolidation strength, the concentration of the organoammonium silicate, alkali metal silicate or ammonium silicate contained in an aqueous slug or the alkylpolysilicate contained in the organic solvent slug can be increased. Similarly, the flow rates of each of these slugs through the formation can be decreased to obtain better consolidation strength. A decreased flow rate is particularly beneficial for increasing the consolidation strength when the alkylpolysilicate slug's flow rate is decreased. As will be understood by those skilled in the art, optimal concentrations and flow rates are formation dependent. Therefore, optimal concentrations and flow rates should be geared to field conditions and requirements.

Injection of aqueous organoammonium silicate, alkali metal or ammonium silicate slug and organic solvent slug 18 containing the alkylpolysilicate can be continued until the formation has been consolidated to a strength sufficient to prevent caving and damage to the wellbore. As will be understood by those skilled in the art, the amount of components utilized is formation dependent and may vary from formation to formation. Core samples obtained from the interval to be treated can be tested to determine the required pore size and amount of cement needed. U.S. Pat. No. 4,549,608 which issued to Stowe et al. teaches a method of sand control where clay particles are stabilized along a face of a fracture. This patent is incorporated by reference herein.

After an interval of the formation has been consolidated, that interval or another adjacent to the wellbore can be perforated and an enhanced oil recovery method conducted therein. Steam-flooding processes which can be utilized when enhancing this sand consolidation process described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W. R. Shu on Apr. 30, 1985. This patent is hereby incorporated by reference herein.

Organoammonium silicate, ammonium or alkali metal silicates having a $SiO_2/M_2O$ molar ratio of about 0.5 to about 4 are suitable for forming a stable alkali silica cement. The metal (M) which is utilized herein comprises sodium, potassium, or lithium. Preferably, the $SiO_2/M_2O$ molar ratio is in the range of about greater than 2. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and form a stronger consolidation due to a higher content of solids.

In those cases where it is not possible to control the viscosity of the silicate solution and preclude entry into a lower permeability zone, a mechanical packer may be used. The silica cement which is formed can withstand pH's of 7 or less and temperatures up to and in excess of about 1,000° C. (1,832° F). The preferred silicates are sodium, lithium and potassium. Potassium is preferred over sodium silicate because of its lower viscosity. Fumed silica, colloidal silica, or other alkali metal hydroxides can be added to modify the $SiO_2/M_2O$ molar ratio of commercial silicate. Colloidal silicate can be used alone or suspended in alkali metal or ammonium silicate as a means of modifying silicate content, pH, and/or $SiO_2$ content.

Organoammonium silicates which can be used in an aqueous solution include those that contain $C_1$ through $C_8$ alkyl or aryl groups and hetero atoms. Tetramethylammonium silicate is preferred.

Alkylpolysilicate (EPS) contained in the water-miscible organic solvent is the hydrolysis-condensation product of alkylorthosilicate according to the reaction equation below:

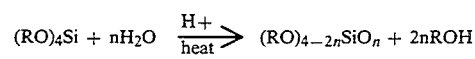

where $n \leq 2$ $R = C_1-C_{10}$

R should be <10 carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50%. EPS which is used herein is placed into a water-miscible organic solvent. The preferred solvent is ethanol. Of course, other alcohols can be used. EPS, TMS, TEOS, or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic solvents can be utilized. These solvents include methanol and higher alcohols, glycols, ketones, tetrahydrofuran (THF), and dimethyl sulfoxide (DMSO).

Although ethanol is the preferred solvent, higher alcohols also can be utilized, as well as other solvents capable of dissolving alkylpolysilicates. The concentration of alkylpolysilicate should be in the range of about 10 to about 100 wt. percent, preferably 20 to about 80 wt. percent. Of course, enough alkylpolysilicate should be used to complete the reaction with the alkali metal or ammonium silicate.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed is:

1. A cement for controlling sand production by forming a gravel pack in an unconsolidated or loosely consolidated formation penetrated by a cased borehole where sand is placed within a washed-out area adjacent said borehole, comprising the steps of:
   a) injecting into said area an aqueous solution of a silicate selected from a member of the group consisting of an alkali metal silicate, ammonium silicate, or organoammonium silicate;
   b) injecting next into said area a spacer volume of a water-immiscible hydrocarbonaceous liquid; and
   c) injecting thereafter into said area a water-miscible organic solvent containing an alkylpolysilicate in an amount sufficient to react with said organoammonium silicate, alkali metal or ammonium silicate so as to form a permeability retentive silica cement within an interval of an underground formation of a strength sufficient to bind silica-containing particles within a formation so as to preclude formation sand from being produced from said interval.

2. The cement as recited in claim 1 where the alkali metal silicate comprises ions of sodium, potassium, or lithium, and mixtures thereof.

3. The cement as recited in claim 1 where the alkali metal silicate has a silicon dioxide to metal oxide molar ratio of greater than about 2.

4. The cement as recited in claim 1 where in step c) the water-miscible organic solvent comprises methanol, ethanol, higher alcohols, glycols, ketones, tetrahydrofuran, and dimethyl sulfoxide.

5. The cement as recited in claim 1 where the alkali metal or ammonium silicate is contained in the solution in an amount of from about 10 to about 60 weight percent.

6. The cement as recited in claim 1 where the alkylpolysilicate is contained in said solution in an amount of about 10 to about 80 weight percent.

7. The cement as recited in claim 1 where said silica cement withstands temperatures in excess of about 1,000° C. (1,832° F.).

8. The cement as recited in claim 1 where the silica cement withstands a temperature in excess of about 1,000° C. (1,832° F.) and a pH of about 7 or less.

9. The cement as recited in claim 1 where in step c) said alkylpolysilicate is a hydrolysis-condensation product of alkylorthosilicate according to the equation below:

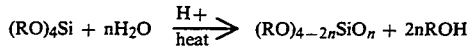

where $n \leq 2$ and $R = C_1 - C_{10}$.

10. The cement as recited in claim 1 where in step c) said hydrocarbonaceous liquid is selected from a member of the group consisting of methanol, higher alcohols, glycols, ketones, tetrahydrofuran, and dimethyl sulfoxide.

11. The cement as recited in claim 1 where in step b) said water-immiscible hydrocarbonaceous liquid is a member selected from the group consisting of mineral oils, napthas, $C_5-C_{40}$ alkanes, and mixtures thereof.

* * * * *